(No Model.)

W. GERHARD.
CHAIN LINK.

No. 310,267. Patented Jan. 6, 1885.

Attest
Inventor
William Gerhard
by his attorney
Francis T. Chambers

UNITED STATES PATENT OFFICE.

WILLIAM GERHARD, OF PHILADELPHIA, PENNSYLVANIA.

CHAIN-LINK.

SPECIFICATION forming part of Letters Patent No. 310,267, dated January 6, 1885.

Application filed October 8, 1884. (No model.)

*To all whom it may concern:*

Be it known that I, WILLIAM GERHARD, of the city of Philadelphia and State of Pennsylvania, have invented an Improvement in Chain-Links, of which the following is a full, true, and accurate description, reference being had to the accompanying drawings, forming part of this specification.

The object of my invention is to overcome certain practical difficulties which have been found to exist in the manufacture of chain-links from bars of steel covered with iron, such as are shown and described in the patent granted to me on the 25th day of July, 1882, and numbered 261,544.

I have discovered that by distributing the steel of the link of combined iron and steel in a number of layers or independent plates or bars of any convenient section separated each from the other and entirely surrounded by iron, and the whole thoroughly consolidated and welded together by rolling, the welding of the bar into links is greatly facilitated and the strength of the link much increased. The number of the steel layers, plates, or bars will be regulated by the size of the link in section. The greater the division of the steel the stronger will be the welded joint of the link. In a link made from a bar of an inch and a half diameter I have found five layers of steel to give good and uniformly satisfactory results. The steel should, for the best results, not be less than one-quarter nor more than one-half of the mass of the link. A link the steel layers of which were substantially about a third of its mass I have found to be the best.

I prefer that the steel layers or rods of the links should be evenly and regularly distributed throughout the bar.

Figure 1:
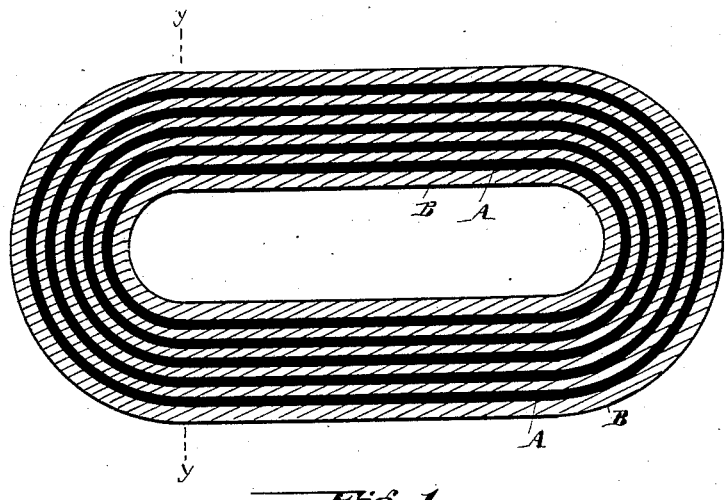
Figure 2:
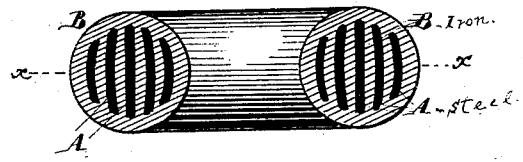

Reference being now had to the drawings, in which Figures 1 and 2 are, respectively, longitudinal and cross sections of my improved links, A represents the steel layers, and B the iron envelope.

Having now described my invention, what I claim as new, and desire to secure by Letters Patent, is—

A chain-link made up of two or more layers of steel enveloped and combined with iron, the combined bars being welded together to form a solid link, substantially as shown and described.

WM. GERHARD.

Witnesses:
 A. J. MONTGOMERY,
 CHAS. H. SAYRE.